US012594936B2

(12) United States Patent
Fukui

(10) Patent No.: US 12,594,936 B2
(45) Date of Patent: Apr. 7, 2026

(54) VEHICLE CONTROL APPARATUS

(71) Applicant: TOYOTA JIDOSHA KABUSHIKI KAISHA, Toyota (JP)

(72) Inventor: Yusuke Fukui, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/734,519

(22) Filed: Jun. 5, 2024

(65) Prior Publication Data

US 2025/0010853 A1 Jan. 9, 2025

(30) Foreign Application Priority Data

Jul. 3, 2023 (JP) ................................. 2023-109020

(51) Int. Cl.
*B60W 30/12* (2020.01)
*B60W 40/08* (2012.01)
*G06V 20/59* (2022.01)

(52) U.S. Cl.
CPC ............ *B60W 30/12* (2013.01); *B60W 40/08* (2013.01); *G06V 20/597* (2022.01); *B60W 2420/403* (2013.01); *B60W 2540/225* (2020.02); *B60W 2720/24* (2013.01)

(58) Field of Classification Search
CPC ...................... G06V 20/597; B60W 2420/403
See application file for complete search history.

(56) References Cited

U.S. PATENT DOCUMENTS

| | | | |
|---|---|---|---|
| 11,001,255 B2 | 5/2021 | Fukuman et al. | |
| 2013/0162794 A1 | 6/2013 | Wakiyama | |
| 2019/0001968 A1 | 1/2019 | Yorifuji et al. | |
| 2019/0135295 A1 | 5/2019 | Sato et al. | |
| 2020/0242936 A1 | 7/2020 | Matsunaga et al. | |
| 2020/0361482 A1* | 11/2020 | Choi ...................... | B60K 35/23 |
| 2021/0300401 A1* | 9/2021 | Hashimoto ........... | G06V 20/58 |
| 2022/0171275 A1 | 6/2022 | Iida et al. | |
| 2022/0289250 A1* | 9/2022 | Oba ..................... | G06V 20/597 |

(Continued)

FOREIGN PATENT DOCUMENTS

| | | |
|---|---|---|
| JP | 2005-153660 A | 6/2005 |
| JP | 2013-152700 A | 8/2013 |
| JP | 2016-038866 A | 3/2016 |

(Continued)

*Primary Examiner* — Long T Tran
(74) *Attorney, Agent, or Firm* — OLIFF PLC.

(57) ABSTRACT

A vehicle control apparatus comprises: a surrounding condition displaying device capable of displaying an image of vehicle surrounding conditions on a monitor inside a vehicle; a driver monitoring device that obtains driver's information including a direction of a line of sight of a driver and a face direction of the driver; and a controller configured to be able to perform a start moving suppression control to suppress a start moving of the vehicle when a mismatch condition is occurring where a start moving direction inferred based on a shift range of the vehicle disagrees with the face direction of the driver. Furthermore, even when the mismatch condition is occurring, the controller does not perform the start moving suppression control, if the direction of the line of sight of the driver is toward the monitor and the monitor is displaying the image of vehicle surrounding conditions.

4 Claims, 5 Drawing Sheets

(56)                 References Cited

U.S. PATENT DOCUMENTS

| | | | | |
|---|---|---|---|---|
| 2024/0034362 A1* | 2/2024 | Oba | ................. | B60W 60/0051 |
| 2024/0294115 A1* | 9/2024 | Komatsu | .................. | B60R 1/28 |

FOREIGN PATENT DOCUMENTS

| | | | |
|---|---|---|---|
| JP | 2019-016825 | A | 1/2019 |
| JP | 2019-077271 | A | 5/2019 |
| JP | 2019-087029 | A | 6/2019 |
| JP | 2019-087143 | A | 6/2019 |
| JP | 2020-078960 | A | 5/2020 |
| JP | 2020-117128 | A | 8/2020 |
| JP | 2022-086516 | A | 6/2022 |

* cited by examiner

Bird's-eye view image     Moving direction image

VEHICLE CONTROL APPARATUS

TECHNICAL FIELD

The present disclosure relates to a vehicle control apparatus that performs a start moving suppression control to suppress a start moving of a vehicle in accordance with conditions when a driver performs an operation to start the vehicle, and a vehicle control method thereof.

BACKGROUND

One of conventional vehicle control apparatuses (hereinafter, referred to as a "conventional apparatus"), disclosed in Japanese Patent Application Laid-Open No. 2020-78960, performs a start moving suppression control to suppress a start moving of a vehicle, when a direction of a line of sight of the driver does not match with a direction of the start moving of the vehicle determined depending on a range (shift position/range) of a transmission of the vehicle.

In addition, the conventional apparatus cancels the start moving suppression control when vehicle surrounding (peripheral/vicinity) information obtained by a vehicle surrounding monitoring system is notified to the driver, in order not to perform the start moving suppression control that is unnecessary.

SUMMARY

However, for example, when the vehicle surrounding information is notified to the driver through displaying an image of vehicle surrounding conditions on a monitor (display), it is sometimes not preferable to cancel the start moving suppression control, because the driver does not always watch (or look to) the monitor. The present disclosure is made to cope with this problem.

In some embodiments of the present disclosure, a vehicle control apparatus comprises:

a camera device (51-54) that produces image data by capturing (taking pictures of) a vicinity (surrounding) area of a vehicle;

a surrounding condition displaying device (55, 10, 80) configured to be able to display an image of vehicle surrounding conditions based on the image data on a monitor/display (81) inside a passenger compartment of the vehicle;

a driver monitoring device (100) that obtains driver's information including a direction of a line of sight of a driver of the vehicle and a face direction of the driver; and a controller (10, 60, 70) configured to be able to perform a start moving suppression control to suppress a start moving of the vehicle when a mismatch condition is occurring where a start moving direction inferred based on a shift range of the vehicle disagrees with the face direction of the driver, wherein, the controller is configured to permit the start moving suppression control to be unexecuted (step 370) if the direction of the line of sight of the driver is toward the monitor even when the mismatch condition is occurring (Yes determinations at step 320, step 330, and step 340).

More specifically, when the mismatch condition is occurring and the direction of the line of sight of the driver is toward the monitor, the controller does not perform the start moving suppression control, if the monitor is displaying the image of vehicle surrounding conditions, and the controller performs the start moving suppression control, if the monitor is not displaying the image of vehicle surrounding conditions.

According to the embodiment described above, when the mismatch condition is occurring where the start moving direction inferred based on the shift range of the vehicle disagrees with the face direction of the driver, the start moving suppression control is not performed, if it is inferred that the driver watches/looks at the image of vehicle surrounding conditions. Therefore, the first and second cases described below can be avoided.

A first case in which the start moving suppression control is not performed, when the driver carries out a start moving operation while the driver neither look to a scene in the start moving direction of the vehicle nor look at the image of vehicle surrounding conditions that is being displayed on the monitor.

A second case in which the start moving suppression control is performed, when the driver looks at the image of vehicle surrounding conditions that is being displayed on the monitor, and thus the performing the start moving suppression control is unnecessary.

The present disclosure covers a vehicle control method carried out by the embodiment of the vehicle control apparatus, and a program thereof. Notably, in the above description, in order to facilitate understanding of the present disclosure, the constituent elements corresponding to those of an embodiment which will be described later are accompanied by parenthesized symbols which are used in the embodiment; however, the constituent elements of the disclosure are not limited to those in the embodiment defined by the symbols.

DETAILED DESCRIPTION (Configuration)

Figure 1:
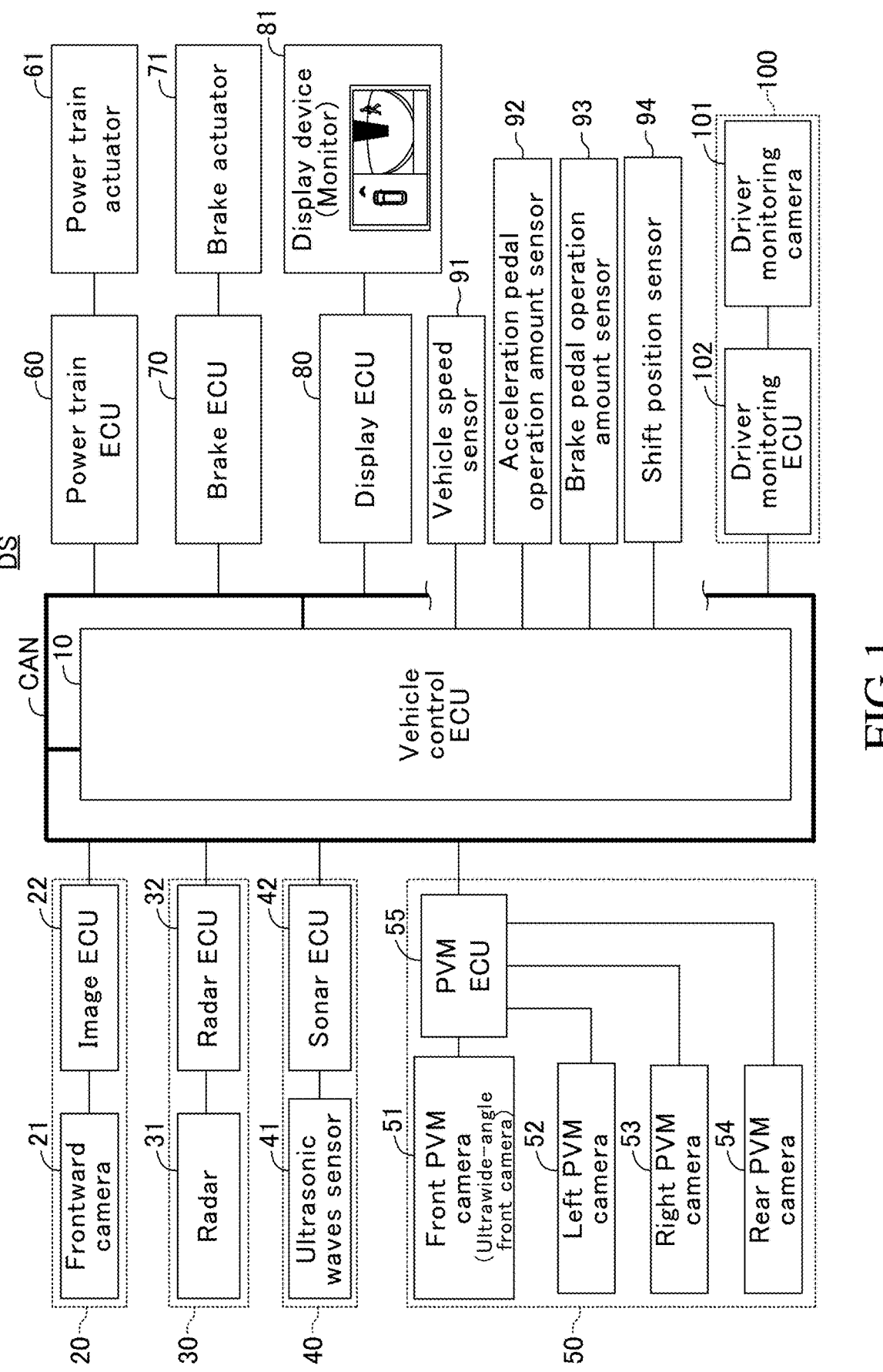
FIG. 1 is a schematic diagram of a vehicle control apparatus according to an embodiment of the present disclosure.

A vehicle control apparatus DS (hereinafter, referred to as an "apparatus DS") according to an embodiment of the present disclosure comprises components/elements such as cameras, sensors, ECUs, and actuators) illustrated in FIG. 1. The apparatus DS is applied to a vehicle.

In the present specification, an "ECU" means an electronic control unit, that includes a microcomputer as a main component, and may sometimes be referred to as a "controller". The microcomputer includes a CPU (processor), memories, or the like. The components including a plurality of the ECUs shown in FIG. 1 are connected to each other in such a manner that they can exchange information with each other through Controller Area Network (CAN).

A vehicle control ECU 10 performs a "start moving suppression control as a vehicle control" described later in detail.

A frontward camera device 20 includes a frontward camera 21 and an image ECU 22. The frontward camera 21 captures (or takes a picture of) a "scene in front of the vehicle, the scene including a road surface and an object" so as to obtain a frontward camera image data, every time a predetermined time elapses. The image ECU 22 produces frontward camera object information by analyzing the frontward camera image data from the frontward camera 21, and transmits the frontward camera object information to the vehicle control ECU 10. The frontward camera object information includes "a position, a relative longitudinal speed, a relative lateral speed, and a type" of an object included in the frontward camera image data.

The frontward radar device 30 is a well-known device configured to obtain information on an object in front of the vehicle using electrical waves in a millimeter waveband, and includes a frontward radar 31 and a frontward radar ECU 32. The frontward radar 31 transmits information on transmitted electrical waves and on received electrical waves (reflected electrical waves) to the frontward radar ECU 32, every time a predetermined time elapses. The frontward radar ECU 32 obtains, based on the information from the frontward radar 31, "frontward radar object information" that is information on an object present in a detection rage of the frontward radar 31, and transmits the "frontward radar object information" to the vehicle control ECU 10. The frontward radar object information includes a distance to the object, an azimuth of the object, and a relative speed of the object.

The ultrasonic waves sensor device 40 includes a plurality of ultrasonic waves sensors (clearance sonars) 41 and a sonar ECU 42. Each of a plurality of the ultrasonic waves sensors 41 is disposed at a predetermined position on a periphery of a body of the vehicle, and emits ultrasonic waves and receives reflected waves that are the ultrasonic waves reflected at an object. The sonar ECU 42 obtains, as "sonar object information", information on an object present in the vicinity of the vehicle, based on information on "timings at which the ultrasonic wave is emitted and timings at which the reflected ultrasonic wave is received". The sonar ECU 42 transmits the sonar object information to the vehicle control ECU 10. The sonar object information includes a position of an object relative to the vehicle and a distance between the object and the body.

The PVM (panoramic view monitor) camera device 50 includes a front PVM camera 51, a left PVM camera 52, a right PVM camera 53, a rear PVM camera 54, and a PVM ECU 55. Each of the PVM cameras 51-54 has a ultrawide-angle lens.

The front PVM camera 51, the left PVM camera 52, the right PVM camera 53, and the rear PVM camera 54 capture (take a picture of) a front scene, a left scene, a right scene, and a rear scene, respectively, so as to obtain respective image data, every time a predetermined time elapses.

The PVM ECU 55 produces, based on the image data transmitted from the PVM cameras 51-54, data on a plane view (bird's-eye view) image of the vehicle and data on a moving direction image, and transmits the data to the vehicle control ECU 10. It should be noted that a structure of each of the PVM cameras 51-54, the plane view (bird's-eye view) image of the vehicle, and the moving direction image are well-known (for example, refer to Japanese Patent Application Laid-Open No. 2022-86516, Japanese Patent Application Laid-Open No. 2020-117128, and Japanese Patent Application Laid-Open No. 2019-016825).

Figure 2:
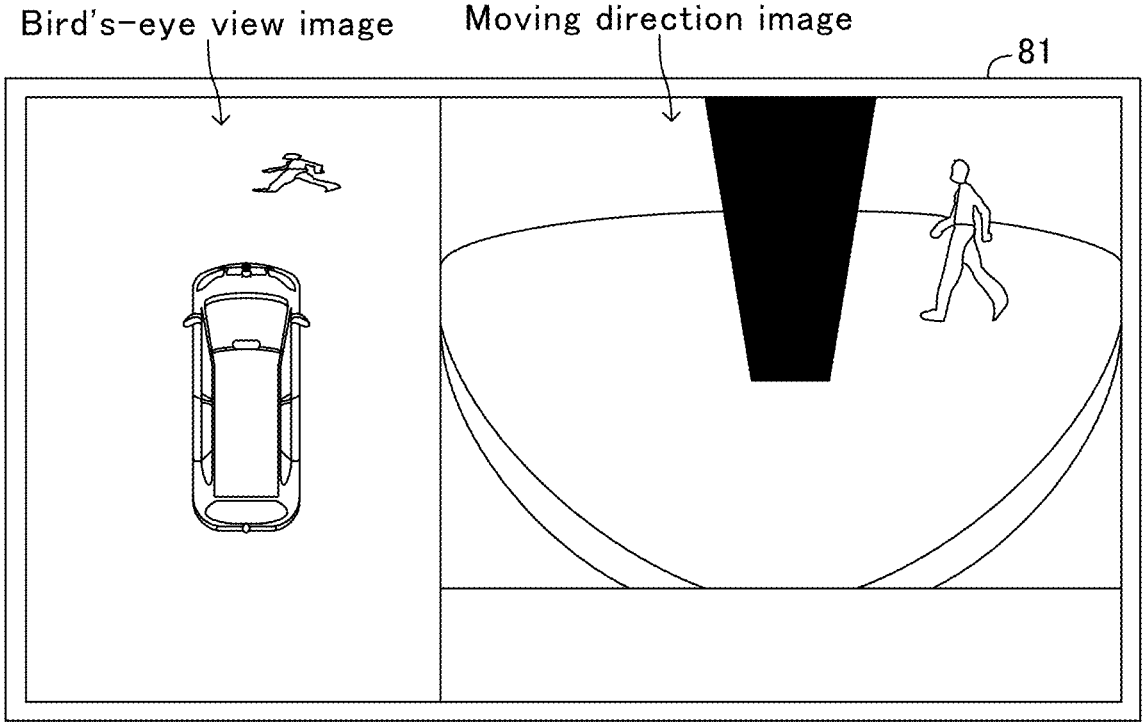
FIG. 2 is a drawing illustrating one example of an image of vehicle surrounding conditions displayed on a monitor (display).

When a predetermined surrounding monitoring condition is satisfied, the vehicle control ECU 10 transmits "the data on the plane view image of the vehicle and the data on the moving direction image" sent from the PVM ECU 55 to the display ECU 80. The display ECU 80 displays, as an "image for monitoring conditions around the vehicle (an image of vehicle surrounding conditions)", the plane view image of the vehicle and the moving direction image on the monitor 81 (refer to FIG. 2). The predetermined surrounding monitoring condition is satisfied when, for example, the vehicle speed SPD is equal to or lower than a predetermined surrounding monitoring vehicle speed threshold, and a vehicle surrounding monitoring function is set to be ON through a touch operation to the monitor 81 by the driver. When the surrounding monitoring condition is satisfied, the moving direction image is the image of the frontward scene based on the imaged data obtained by the front PVM camera 51 if the shift range detected by the shift position sensor 94 described later is a forward range or another range other than a backward (reverse) range. When the surrounding monitoring condition is satisfied, the moving direction image is the image of the rearward scene based on the imaged data obtained by the rear PVM camera 54 if the shift range detected by the shift position sensor 94 described later is the backward (reverse) range. When the surrounding monitoring condition is not satisfied, the display ECU 80 displays an "image other than the image of vehicle surrounding conditions" on the monitor 81

The power train ECU 60 is connected to the power train actuator 61 to drive the actuator 61. The actuator 61 can change a torque which the driving device of the vehicle (driving source of the vehicle) generates. The torque which the driving device of the vehicle generates is transmitted to driving wheels through unillustrated gear mechanisms. Therefore, the power train ECU 60 can control the driving force of the vehicle.

When the driving device of the vehicle is a gasoline internal combustion engine, the actuator 61 is a throttle valve actuator that changes an opening degree of an throttle valve, for example. The vehicle may be an electric vehicle. When the vehicle is the electric vehicle, the actuator 61 is an inverter that changes a torque of an electric motor. In addition, the vehicle may be a hybrid vehicle. When the vehicle is the hybrid vehicle, the actuator 61 includes the inverter for the electric motor and the throttle valve actuator.

The brake ECU 70 drives the brake actuator 71 so as to change a brake force (frictional brake force) given to the vehicle by controlling a frictional brake device provided to each wheel of the vehicle. Therefore, the brake ECU 70 can control the brake force of the vehicle.

The display ECU 80 can display various images on the monitor (display). The monitor 81 is fixed inside the vehicle passenger compartment and at a predetermined position (e.g., at a center cluster) in front of the driver's seat. Therefore, when the driver is watching the monitor 81, a face direction of the driver (a turning direction of his/her face) is frontward of the vehicle.

The vehicle control ECU 10 is further connected to sensors described below, and receives output values (detected values) of the sensors.

The vehicle speed sensor 91 that detects a speed of the vehicle (i.e., vehicle speed SPD).

The acceleration pedal operation amount sensor 92 that detects an operation amount AP of the acceleration pedal of the vehicle.

The brake pedal operation amount sensor 93 that detects an operation amount BP of the brake pedal of the vehicle.

The shift position sensor 94 that detects a position of the shift lever (i.e., that detects the shift range) of the vehicle.

It should be noted that, in the present example, the shift position sensor 94 generates a signal that indicates one of the shift positions including the forward driving range (D) to move the vehicle forward, the reverse driving range (R) to move the vehicle backward, and other range (N, P). The vehicle control ECU 10 is connected to the other sensors that detect the driving conditions of the vehicle.

The driver monitoring device (driver monitor) 100 is a device that obtains information (i.e., driver's information) on the conditions of the driver of the vehicle (including the direction of the line of sight of the driver and the face direction of the driver). The driver monitoring device 100 includes the driver monitoring camera 101 and the driver monitoring ECU 102. The driver monitoring device 100 is well-know, and is disclosed in, for example, Japanese Patent Application Laid-Open No. 2019-87143, Japanese Patent Application Laid-Open No. 2019-87029, Japanese Patent Application Laid-Open No. 2016-38866, and Japanese Patent Application Laid-Open No. 2013-152700.

The driver monitoring camera 101 is disposed at an appropriate position (e.g., upper position of the steering column) in front of the driver's seat of the vehicle, and is configured to produce face image data of the driver by capturing (taking a picture of) the driver's face every time a predetermined time elapses. The driver monitoring ECU 102 obtains above described driver's information based on the face image data of the driver sent from the driver monitoring camera 101, and transmits the driver's information to the vehicle control ECU 10.

The driver monitoring ECU 102 will be briefly described. The driver monitoring ECU 102 generates a face image based on the face image data sent from the driver monitoring camera 101, and rotates the face image. A turning angle of the face image is obtained when a concordance rate between the turned face image and a face image obtained in advance when the driver faces the front is the highest. The face direction of the driver is obtained based on the thus obtained turning angle.

The the driver monitoring ECU 102 specifies a face area from the generated face image of the driver, and detects face parts such as eyes, a nose, a mouth, or the like by extracting feature points of the face parts from the face area. Furthermore, the driver monitoring ECU 102 detects a position of the Purkinje image (corneal reflection image) and a position of the center of the pupil, and then, obtains a relationship between the position of the Purkinje image and the position of the center of the pupil. Thereafter, the driver monitoring ECU 102 obtains the direction of the line of sight of the driver based on the relationship between the position of the Purkinje image and the position of the center of the pupil as well as the face direction of the driver.

(Outline of Operation)

The apparatus DS determines whether or not the driver is performing an abnormal start moving operation, based on the start moving direction of the vehicle inferred based on the shift range, the direction of the line of sight of the driver, the face direction of the driver, and a state of whether or not the image of vehicle surrounding conditions is being displayed on the monitor 81. The apparatus DS performs or cancels the start moving suppression control to suppress the start moving of the vehicle, based on the result of the above-described determination. The start moving suppression control is a control to maintain the driving force of the vehicle at a driving force for creeping that is required for the vehicle to creep, by, for example, setting the opening degree of the throttle valve at zero irrespective of the acceleration pedal operation amount AP. In other words, the start moving suppression control is a control to generate the driving force smaller than the normal driving force that varies depending on the acceleration pedal operation amount AP. The start moving suppression control may include a brake force control to apply the brake force to the vehicle until the vehicle is fully stopped or until the vehicle speed decreases down to a very low speed equal to or lower than a creeping vehicle speed.

(Specific Operation)

The CPU of the vehicle control ECU 10 (hereinafter, simply referred to as a "CPU") executes routines shown by flowcharts in FIGS. 3-5, every time a predetermined time elapses.

<Abnormal Start Moving Operation Determination when the Start Moving Direction is Backward>

Figure 3:
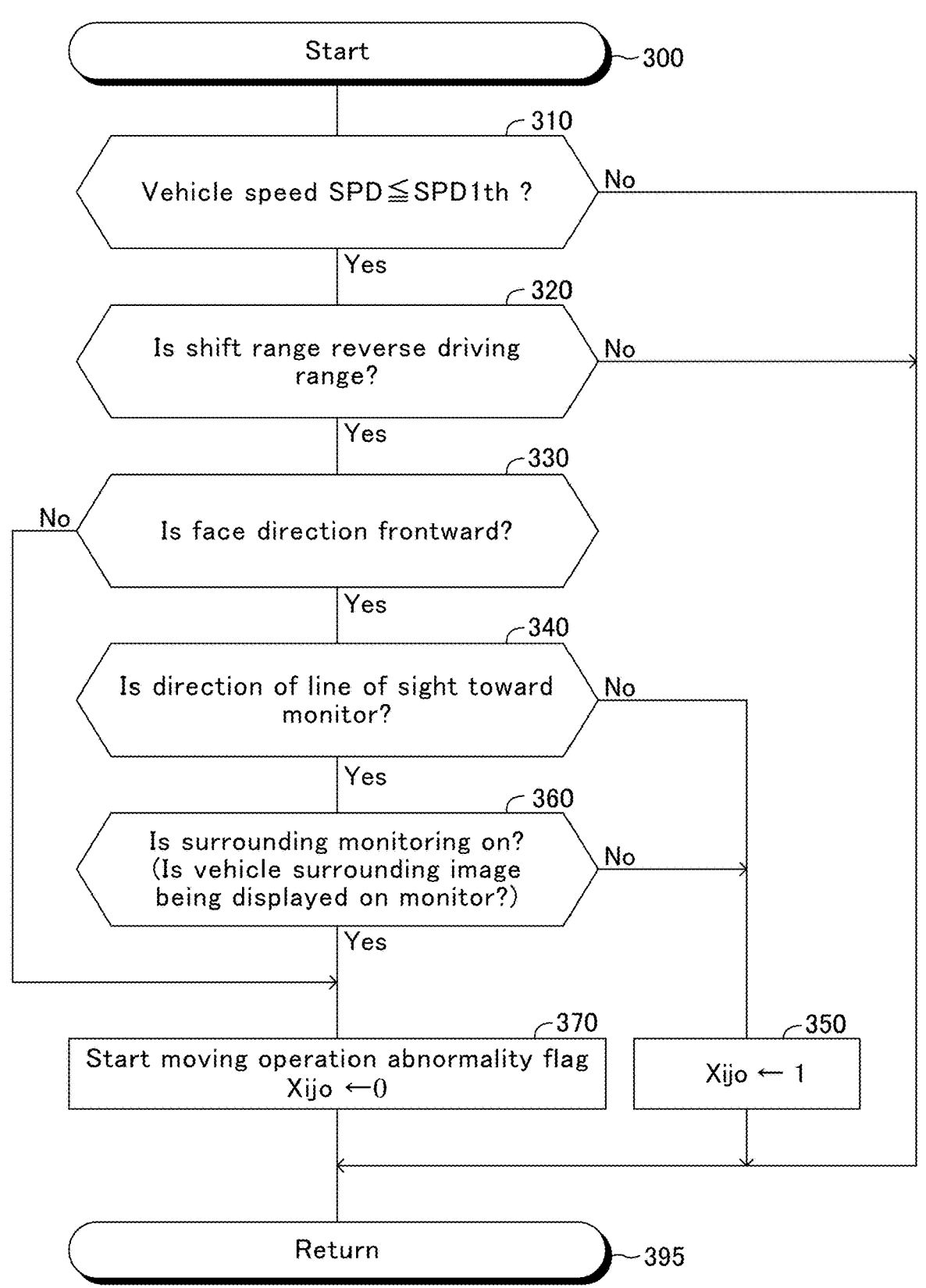
FIG. 3 is a flowchart illustrating a routine executed by a CPU of a vehicle control ECU.

When an appropriate time point comes, the CPU starts processing from step 300 in FIG. 3, and proceeds to step 310. At step 310, the CPU determines whether or not the vehicle speed SPD is equal to or lower than a first vehicle speed threshold SPD1*th*. The first vehicle speed threshold SPD1*th* has been set at a very low predetermined value so that the CPU can determine whether or not the vehicle is in a condition before start moving.

When the vehicle speed SPD is equal to or lower than the first vehicle speed threshold SPD1*th*, the CPU proceeds to step 320 from step 310, and determines whether or not the shift range is the reverse (backward) driving range (i.e., whether or not the start moving direction of the vehicle is backward) based on the signal from the shift position sensor 94.

When the shift range is the reverse driving range, the CPU proceeds from step 320 to step 330, and determines whether or not the face direction of the driver is frontward based on the above-described driver's information. For example, when the face direction of the driver is in a rage from 90 degrees leftward with respect to a front-rear axis direction of the vehicle to 90 degrees rightward with respect to the front-rear axis direction, the CPU determines that the face direction of the driver is frontward. When the face direction of the driver is not frontward (i.e., the driver's face turns backward), the CPU directly proceeds to step 370 described later from step 330.

Whereas, when the face direction of the driver is frontward (i.e., when the mismatch condition is occurring where the start moving direction disagrees with the face direction of the driver), the CPU proceeds to step 340 from step 330, and determines whether or not the direction of the line of sight of the driver is toward the monitor 81 (or is aligned with the monitor direction) When the direction of the line of sight of the driver is not toward the monitor 81 (i.e., is not aligned with the monitor direction), the CPU determines that the abnormal start moving operation is being performed, and proceeds to step 350 from step 340. At Step 350, the CPU sets a value of a start moving operation abnormality flag Xijo to "1", and proceeds to step 395 to terminate the present routine tentatively.

Whereas, when the direction of the line of sight of the driver is toward the monitor 81 (matches with the monitor direction), the CPU proceeds to step 360 from step 340, and determines whether or not the image of vehicle surrounding conditions is being displayed on the monitor 81. When the image of vehicle surrounding conditions is not being displayed, the CPU determines that the abnormal start moving operation is being performed, and proceeds to step 350 from step 360. At step 350, the CPU sets the value of the start moving operation abnormality flag Xijo to "1", and proceeds to step 395 to terminate the present routine tentatively.

Whereas, when the image of vehicle surrounding conditions is being displayed, the CPU determines that the normal start moving operation is being performed, and proceeds to step 370 from step 360. At step 370, the CPU sets the value of the start moving operation abnormality flag Xijo to "0", and proceeds to step 395. It should be noted that the value of the start moving operation abnormality flag Xijo is set to "0", when the vehicle is fully stopped.

When at least one of the conditions at step 310 and step 320 is not satisfied, the CPU directly proceeds to step 395 from either step 310 or step 320.

<Abnormal Start Moving Operation Determination when the Start Moving Direction is Frontward>

Figure 4:
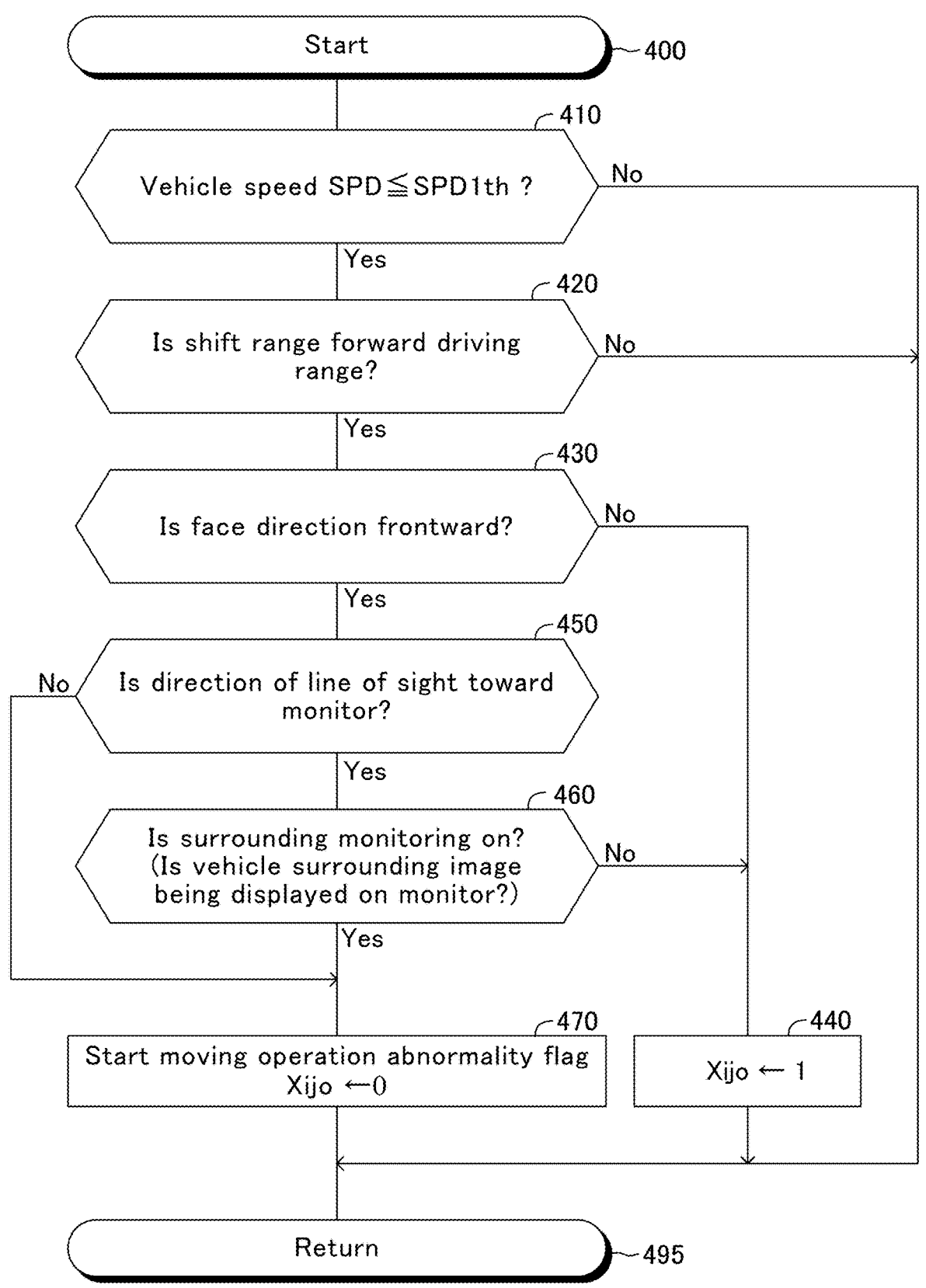
FIG. 4 is a flowchart illustrating a routine executed by the CPU of the vehicle control ECU.

When an appropriate time point comes, the CPU starts processing from step 400 in FIG. 4, and proceeds to step 410. At step 410, the CPU determines whether or not the vehicle speed SPD is equal to or lower than the first vehicle speed threshold SPD1*th*. When the vehicle speed SPD is equal to or lower than the first vehicle speed threshold SPD1*th*, the CPU proceeds to step 420 from step 410, and determines whether or not the shift range is the forward driving range (i.e., whether or not the start moving direction of the vehicle is frontward) based on the signal from the shift position sensor 94.

When the shift range is the forward driving range, the CPU proceeds from step 420 to step 430, and determines whether or not the face direction of the driver is frontward based on the above-described driver's information. When the face direction of the driver is not frontward (i.e., when the mismatch condition is occurring), there is no possibility that the direction of the line of sight of the driver is toward the monitor 81 (or is aligned with the monitor direction), since the monitor 81 is located in front of the driver. Namely, in this case, there is a possibility that the abnormal start moving operation is performed. In view of this, the CPU proceeds to step 440 from step 430, and sets the value of the start moving operation abnormality flag Xijo to "1". Thereafter, the CPU proceeds to step 495 to terminate the present routine tentatively.

Whereas, when the face direction of the driver is frontward, the CPU proceeds to step 450 from step 430, and determines whether or not the direction of the line of sight of the driver is toward the monitor 81 (or is aligned with the monitor direction). When the direction of the line of sight of the driver is not toward the monitor 81 (i.e., is not aligned with the monitor direction), the driver watches frontward from the vehicle. In this case, the CPU determines that the normal start moving operation is being performed, and proceeds to step 470 described later.

Whereas, when the direction of the line of sight of the driver is toward the monitor 81 (i.e., is aligned with the monitor direction), the CPU proceeds to step 460 from step 450, and determines whether or not the image of vehicle surrounding conditions is being displayed on the monitor 81. When the image of vehicle surrounding conditions is not being displayed, the CPU determines that the abnormal start moving operation is being performed, and proceeds to step 440 from step 460 to set the value of the start moving operation abnormality flag Xijo to "1". Thereafter, the CPU proceeds to step 495.

Whereas, when the image of vehicle surrounding conditions is being displayed, the CPU determines that the normal start moving operation is being performed, and proceeds to step 470 from step 460. At step 470, the CPU sets the value of the start moving operation abnormality flag Xijo to "0", and proceeds to step 495.

When at least one of the conditions at step 410 and step 420 is not satisfied, the CPU directly proceeds to step 495 from either step 410 or step 420.

<Start Moving Suppression Control>

Figure 5:
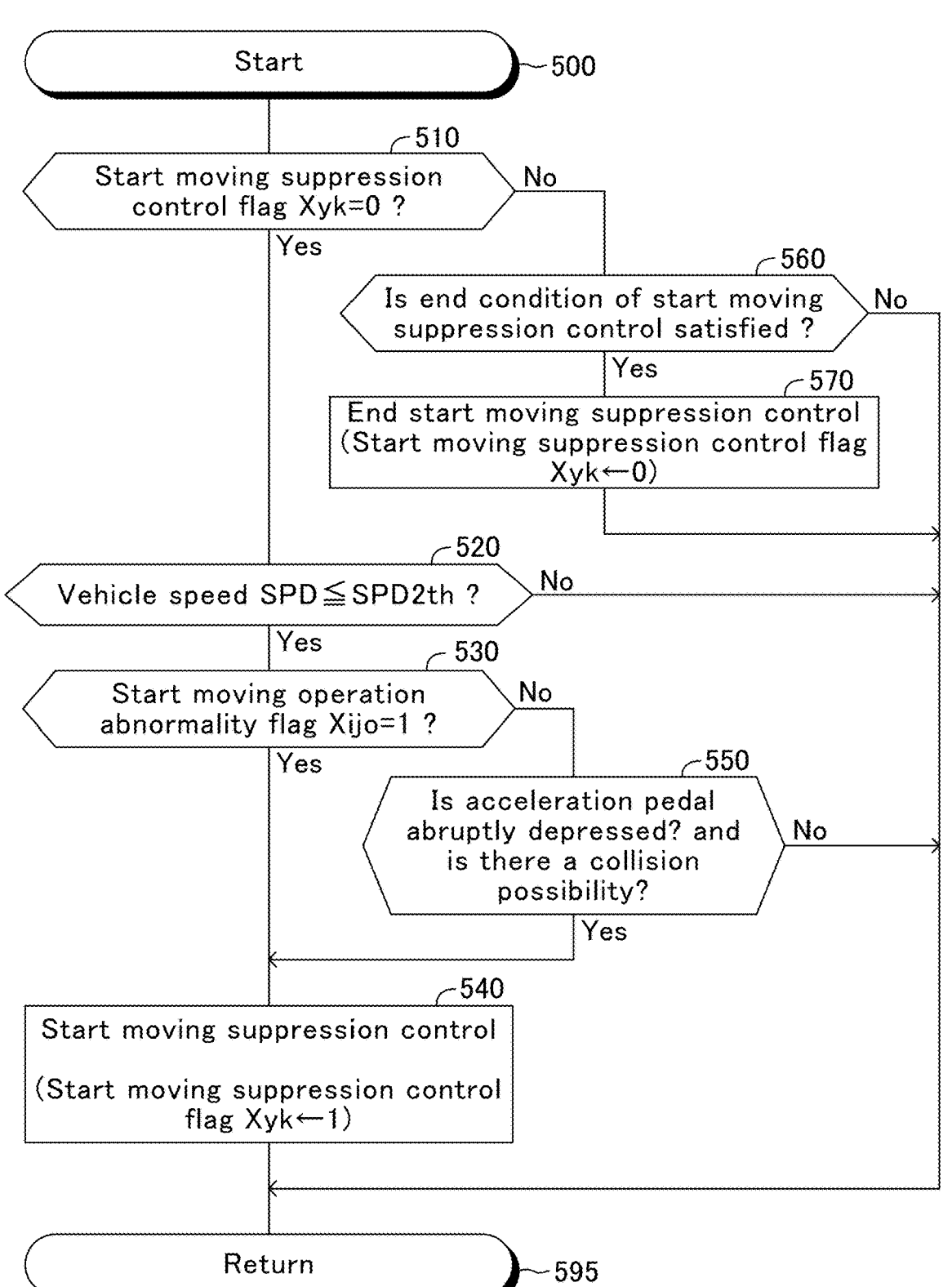
FIG. 5 is a flowchart illustrating a routine executed by the CPU of the vehicle control ECU.

When an appropriate time point comes, the CPU starts processing from step 500 in FIG. 5, and proceeds to step 510. At step 510, the CPU determines whether or not a value of a start moving suppression control flag Xyk is "0". Namely, the CPU determines whether or not the start moving suppression control is currently not being performed.

When the value of the start moving suppression control flag Xyk is "0", the CPU proceeds to step 520 from step 510, and determines whether or not the vehicle speed SPD is equal to or lower than a "second vehicle speed threshold SPD2*th* that is higher than the first vehicle speed threshold SPD1*th*". When the vehicle speed SPD is neither equal to nor lower than the second vehicle speed threshold SPD2*th*, the CPU proceeds to step 595 so as to terminate the present routine tentatively. Whereas, when the vehicle speed SPD is equal to or lower than the second vehicle speed threshold SPD2*th*, the CPU proceeds to step 530 from step 520, and determines whether or not the value of the start moving operation abnormality flag Xijo is "1".

When the value of the start moving operation abnormality flag Xijo is "1", the CPU proceeds to step 540 from step 530, and sets the value of the start moving suppression control flag Xyk to "1". Thereafter, the CPU proceeds to step 595 to terminate the present routine tentatively. It should be noted that the CPU performs the above-described start moving suppression control by transmitting instructions to the power train ECU 60 and the brake ECU 70 through executing an unillustrated routine, when the value of the start moving suppression control flag Xyk is "1".

When the CPU proceeds to step 530, the CPU proceeds to step 550 from step 530 if the value of the start moving operation abnormality flag Xijo is "0". At step 550, the CPU determines whether or not the acceleration pedal is abruptly depressed and it is likely that the vehicle collides with an obstacle. Namely, the CPU determines whether or not a collision condition is satisfied. More specifically, the CPU determines whether or not an increasing amount of the acceleration pedal amount AP per unit time is equal to or greater than a increasing threshold, and an obstacle is present in an area that is in the vehicle start moving direction inferred from the shift range and that is withing a distance threshold from the vehicle, based on the acceleration pedal operation amount AP, the frontward camera object information, the radar object information, the sonar object information, the sonar object information, or the like. When the collision condition is satisfied, the CPU proceeds to step 540 from step 550. Whereas, when the collision condition is not satisfied, the CPU proceeds to step 595 from step 550.

When the CPU makes "No" determination at step 510, the CPU proceeds to step 560 from step 510, and determines whether or not an end condition of the start moving suppression control is satisfied. The end condition is satisfied, when, for example, the brake pedal operation amount BP is equal to or greater than the threshold BP (i.e. the bake operation is performed), and the vehicle speed SPD becomes "0". When the end condition of the start moving suppression control is not satisfied, the CPU proceeds to step 595 from step 560. When the end condition of the start moving suppression control is satisfied, the CPU proceeds to step

570 from step 560, and sets the value of the start moving suppression control flag Xyk to "0". Thereafter, the CPU proceeds to step 595.

As has been described above, the apparatus DS basically performs the start moving suppression control when the mismatch condition is occurring, however, the apparatus DS does not perform the start moving suppression control if it is inferred that the driver watches (or look at) the image of vehicle surrounding conditions displayed on the monitor 81 even when the mismatch condition is occurring. Accordingly, the apparatus DS can perform and cancel the start moving suppression control appropriately (i.e., the apparatus DS can properly choose either execution of the start moving suppression control or inexecution of the start moving suppression control). It should be noted that the apparatus DS can be applied to a vehicle that performs autonomous driving control when a predetermined condition is satisfied. Furthermore, the vehicle may have the monitors 81 that are disposed at a plurality of positions inside the passenger compartment. In this case, the driver monitoring cameras may be disposed at appropriate positions in such a manner that at least one of the cameras can determine whether or not the direction of the line of sight of the driver is toward one of the monitors 81.

What is claimed is:

1. A vehicle control apparatus comprising:
a camera device configured to produce image data by capturing a vicinity area of a vehicle;
a surrounding condition displaying device configured to be able to display an image of vehicle surrounding conditions based on said image data on a monitor inside said vehicle;
a driver monitoring device configured to obtain driver's information including a direction of a line of sight of a driver of said vehicle and a face direction of said driver; and
a controller configured to be able to perform a start moving suppression control to suppress a start moving of said vehicle when a mismatch condition is occurring where a start moving direction inferred based on a shift range of said vehicle disagrees with said face direction of said driver when a vehicle speed is equal to or lower than a first vehicle speed threshold, and to perform, when said mismatch condition is determined to be occurring, a start moving suppression control to suppress a start moving of said vehicle by maintaining a driving force of said vehicle at a driving force for creeping irrespective of an acceleration pedal operation amount,
wherein,
said controller is configured to permit said start moving suppression control to be unexecuted when an inexecution condition is satisfied if said direction of said line of sight of said driver is toward said monitor even when said mismatch condition is determined to be occurring, wherein said inexecution condition is satisfied when said direction of said line of sight of said driver is toward said monitor while said monitor is displaying said image of vehicle surrounding conditions.

2. The vehicle control apparatus according to claim 1, wherein,
when said mismatch condition is occurring and said direction of said line of sight of said driver is toward said monitor,
said controller is configured not to perform said start moving suppression control, if said monitor is displaying said image of vehicle surrounding conditions, and
said controller is configured to perform said start moving suppression control, if said monitor is not displaying said image of vehicle surrounding conditions when said mismatch condition is determined to be occurring, regardless of whether or not a collision condition is satisfied, wherein said collision condition is satisfied when it is likely that said vehicle will collide with an obstacle, provided that said inexecution condition is not satisfied.

3. The vehicle control apparatus according to claim 1, wherein,
said monitor is disposed in front of said driver who is seated in a driver's seat of said vehicle; and
when a condition, as said mismatch condition, where a start moving direction of said vehicle is backward and said face direction of said driver is frontward is determined to be occurring,
said controller is configured not to perform said start moving suppression control, if said direction of said line of sight of said driver is toward said monitor and said monitor is displaying said image of vehicle surrounding conditions, and
said controller is configured to perform said start moving suppression control, if said direction of said line of sight of said driver is not toward said monitor or if said monitor is not displaying said image of vehicle surrounding conditions.

4. The vehicle control apparatus according to claim 1, wherein,
said monitor is disposed in front of said driver who is seated in a driver's seat of said vehicle;
when a condition, as said mismatch condition, where a start moving direction of said vehicle is frontward and said face direction of said driver is not frontward is determined to be occurring, said controller is configured to perform said start moving suppression control; and
when said start moving direction of said vehicle is frontward and said face direction of said driver is frontward,
said controller is configured not to perform said start moving suppression control, if said direction of said line of sight of said driver is not toward said monitor or if said direction of said line of sight of said driver is toward said monitor and said monitor is displaying said image of vehicle surrounding conditions, and
said controller is configured to perform said start moving suppression control, if said direction of said line of sight of said driver is toward said monitor and said monitor is not displaying said image of vehicle surrounding conditions.

* * * * *